United States Patent

Baensch et al.

[11] 3,993,028
[45] Nov. 23, 1976

[54] DEVICE FOR FEEDING FISH

[75] Inventors: Hans Baensch, Melle; Hans Burger, Iserlohn, both of Germany

[73] Assignee: Ulrich Baensch, Melle, Germany

[22] Filed: June 12, 1975

[21] Appl. No.: 586,307

[30] Foreign Application Priority Data
Jan. 29, 1974  Germany............................ 2404084

[52] U.S. Cl.............................................. 119/51 R
[51] Int. Cl.[2]........................................ A01K 61/02
[58] Field of Search .................................. 119/51 R

[56] References Cited
UNITED STATES PATENTS

| | | | |
|---|---|---|---|
| 2,961,994 | 11/1960 | Kopietz............................. | 119/51 R |
| 3,512,505 | 5/1970 | Cross et al. ....................... | 119/51 R |
| 3,742,912 | 7/1973 | Chen et al.......................... | 119/51 R |

Primary Examiner—Hugh R. Chamblee
Attorney, Agent, or Firm—Walter Becker

[57] ABSTRACT

A device for feeding fish, especially pet fish, according to which a floating body for floating on the water in an aquarium carries tubular means which are inclined or arranged vertically upwardly from the floating body and are adapted to slideably receive and guide fish food bodies arranged one on top of the other. The lower end of the tubular means is partially open to permit fish access to the respective lowermost body of fish food in the tubular means while preventing a dropping-out of the fish food bodies from the tubular means. The invention also concerns a fish food body which may be ballshaped, may have a spherical head and flat bottom or a conical head and flat bottom or any other shape so as to assure when the fish food bodies are arranged one on top of the other, substantial contact point only of the lower fish food body with the next higher fish food body.

14 Claims, 4 Drawing Figures

DEVICE FOR FEEDING FISH

The present invention relates to a device for feeding fish, especially pet fish, by means of a floating body carrying the supply of food.

With heretofore know devices of the type involved, the food is held together in floating rings, if desired, by utilizing a net, and is so dispensed. With these devices, the supply of food is limited as to quantity and furthermore in its entirety is arranged in the water of the aquarium. Therefore, a feeding over a longer period of time is impossible.

It is an object of the present invention so to improve the above mentioned heretofore known devices so that on one hand the same will be able to float and on the other hand the same will make possible a feeding over a longer period of time for instance over a week.

These objects and other objects and advantages of the invention wil appear more clearly from the following specification in connection with the accompanying drawing, in which.

Figure 1:
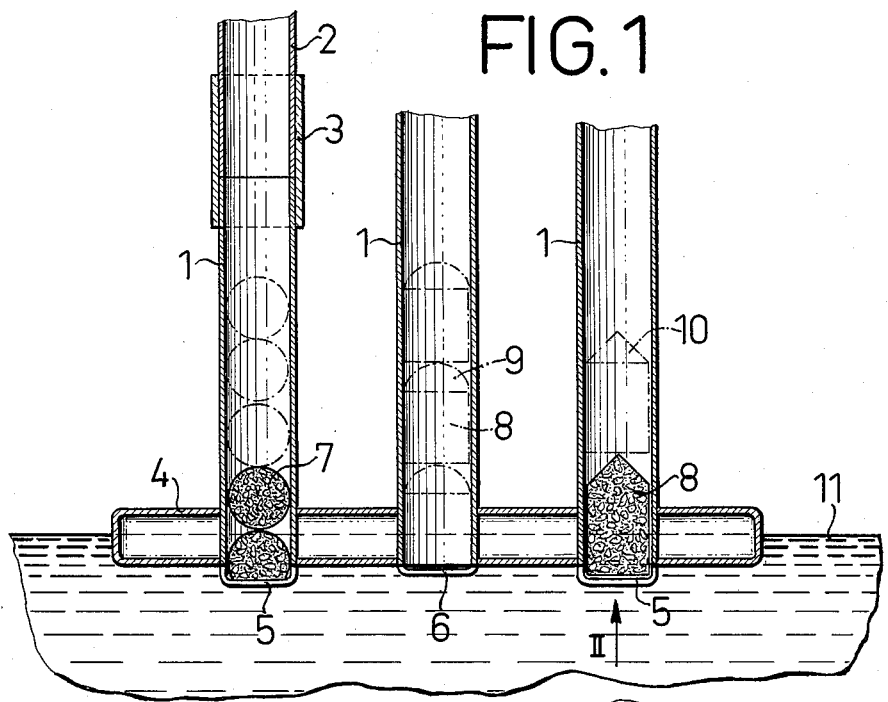
FIG. 1 represents a vertical section through a device according to the invention for feeding pet fish.

The device according to the invention for feeding fish, especially pet fish, with a floating body supporting a supply of fish food is characterized primarily by one or more guiding bodies which extend at an incline or perpendicularly with regard to the water surface of the aquarium and are connected to the floating body for receiving superimposed food bodies, said guiding bodies ending closely above the water surface or at said water surface. Of particular importance in this connection are the food bodies which are designed as formed or pressed articles and have a diameter which substantially corresponds to the inner diameter of the food guiding bodies so that the guiding bodies can serve as magazines or storage bodies for the superimposed food elements. At the lower end of the above mentioned guiding bodies there is an abutment for the food bodies which prevents an undesired slipping of the food bodies out of the guiding bodies but is so designed that the fish will be able to have sufficient access to the respective lowermost food body to feed thereon. To this end, the abutment may for instance be in the form of a narrow cross bar or may consist of two or more arms extending partially across the bottom opening of the container or guiding members for the food bodies.

Referring now to the drawing in detail, the device according to the invention comprises one or more tubular members 1 for instance of any suitable synthetic material, which, if desired, may be extensible by means of a sleeve 3. The tubular members 1 pass through a flat hollow body 4 which may likewise be of a suitable synthetic material and which serves as floating body and keeps the tubular members 1 in the desired position, for instance a vertical position. The tubular members 1 are connected to the floating body 4 in any convenient manner and may for instance be cemented thereon. According to the specific embodiment shown in FIG. 1, the lower end of the tubular bodies 1 ends at the lower horizontal confining surface of the hollow floating body 4. The lower opening of said tubular bodies 1 is bridged by a transverse arm 5 which is arranged below and in spaced relationship to the lower end or rim of the tubular body 1. The spacing is, however, not an indispensible requirement.

Figure 2:
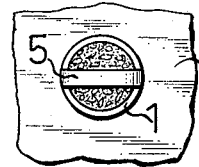
FIG. 2 shows a detail of FIG. 1 and more specifically shows a bottom view of one of the tubular elements shown in FIG. 1.

According to FIG. 2, the transverse arm 6 connected to the middle tubular member 1 is provided directly adjacent the lower end of the tubular member.

Within the tubular members 1 there are provided the food bodies 7 and 8 which are designed as pressed bodies and which may be pressed out of food particles which can be nibbled off by the fish. The composition of the food bodies 7,8 is not of a decisive importance for the present invention but the food bodies, of course, contain a plurality of small food particles or the like and must be resistant against the influence of water so that they will not dissolve immediately or disintegrate when coming in contact with the water of the aquarium. The food bodies 7,8 are loosely superimposed upon each other and have a diameter which nearly corresponds to the inner diameter of the tubular member 1, but leaves sufficient play in order to assure that the food bodies 7,8 can slide downwardly when the lowermost food body which is freely accessible to the fish has been nibbled off and removed from the respective tubular body.

In this connection, it is also important that water which might possibly enter a food body cannot penetrate in the superimposed food bodies. It is for this reason that the food bodies 7,8 are given a particular shape. More specifically, the food bodies 7 are ball-shaped or egg-shaped, whereas the food bodies 8 above an approximately cylindrical section have a calotte or spherical top section 9 or a conical extension 10. In this way, a very small contact surface between adjacent food bodies is created which approximates a point contact and thus prevents any substantial transfer of moisture from the lowermost food body to the next higher food body. FIG. 1 shows that the hollow body 4 immerses up to half of its height in the water 11 of the aquarium. The flat configuration of this floating body also secures the vertical position of the hollow tubular members 1.

Inasmuch as the arms 5,6 are narrower than the inner outlet opening of the tubular members 1, there is sufficient space left for the fish to have access to the bottom side of the food bodies 7,8. The more the food bodies have been nibbled off, the more the superimposed food bodies press downwardly. If from the lowermost food bodies 7,8 (as illustrated with the lefthand tubular body 1 of FIG. 1) a residual piece remains on the transverse arm 5, this piece can drop out and serve those fish as food which pick the food from the bottom of the aquarium. With the embodiment of FIGS. 3 and 4, longitudinally extending guiding means 12 for instance with undercut are provided at the lower end of the tubular member 1 into which guiding means 12 corresponding protrusions extend of floating bodies 13 which are to be distributed over the circumference of the tubular member 1. This is arranged in such a way that the number of the floating bodies 13 can be varied. In this way it is possible to adjust the immersing depth and to adapt the same to the perhaps differently heavy food bodies 8. At any rate, care has to be taken that the immersing depth is not too great. As far as possible, only one food body 7,8 at a time should have its lower end immersed in the water of the aquarium.

Figure 3:
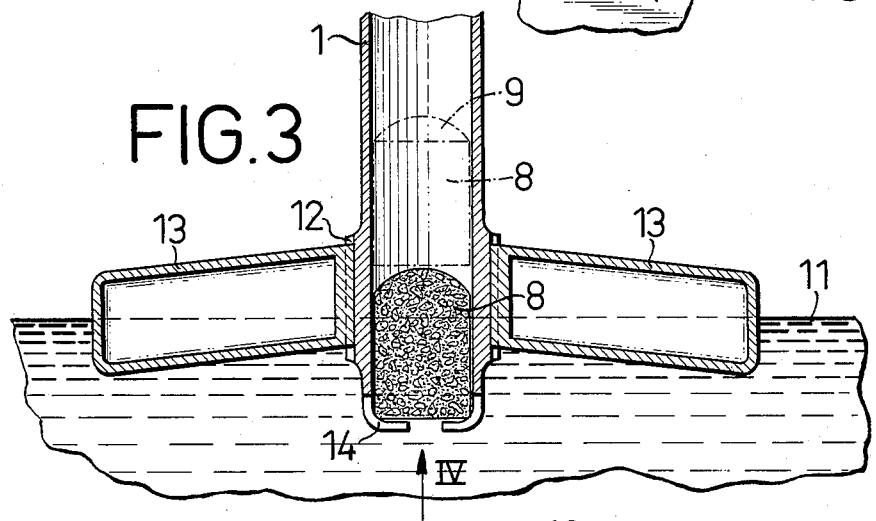
FIG. 3 shows a part of a vertical section through a modification of the invention for feeding pet fish.
Figure 4:
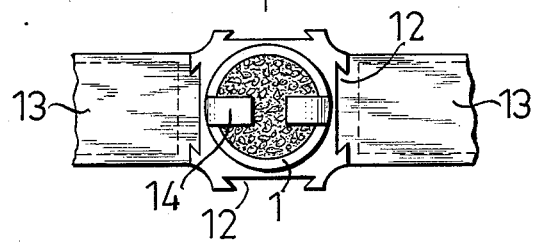
FIG. 4 shows a bottom view of the central element of FIG. 3.

In contrast to the embodiment of FIGS. 1 and 2, the transverse arms 14 of FIG. 3 do not completely bridge the clear opening of the tubular member 1 but extend only over a portion of said opening for instance over 1/3 thereof on opposite sides. This increases the accessibility of the food bodies to the fish.

The guiding means 12 which extend alongside the tubular member 1 have the advantage that by displacing the floating body 13 with regard to the tubular member 1, the immersing depth of the latter can be adjusted. It is a matter of course that in lieu of the illustrated floating bodies also modified bodies may be employed. Thus, instead of the hollow bodies, full-walled bodies for instance circular or porous floating bodies, may be utilized.

It is furthermore possible to arrange the tubular bodies 1 serving as magazine or storage members, not vertically but at an incline to the horizontal plane. In this way, it is possible to reduce the force at which the food bodies 7,8 are urged downwardly. Furthermore, instead of the individual tubular members, also twin or triplicate tubes may be employed which may be charged with different food members. At any rate, it is expedient to adapt the food bodies 7,8 to the inner diameter of the tubular member. It has proved particularly advantageous to utilize food bodies having a diameter of from 8 to 15mm and having a length amounting to about once or twice these values.

The guiding members 1 may also be formed by bars, rods or the like distributed around the circumference of the guiding means. In this way, a cage-like holding means is formed, the walls of which are perforated.

Instead of the transverse arms 5,6 and 14, also tapered elements may be employed for holding the food bodies 7,8 to which end, channel or tubular guiding means are at their lower end bent or angled off inwardly so as to reduce the clear outlet opening.

It is also possible to provide the guiding means or tubular members 1 preferably near above the water surface 11 with one or more perforations for instance in the form of connecting pieces through which if desired pre-heated or dried air may be passed.

It is, of course, to be understood that the present invention is, by no means, limited to the specific showing in the drawing but also comprises any modificatiions within the scope of the appended claims.

What we claim is:

1. A device for feeding fish, especially pet fish, which includes: a floating body adapted to float on water, tubular means forming an angle with said floating body and being supported thereby for slidingly receiving and guiding bodies of fish food, said tubular means extending below the water line of said floating body and being partially open at the lower end thereof so as to hold bodies of fish food in said tubular means while permitting fish to have access to the respective lowermost body of fish food in said tubular means, in which said floating body comprises a plurality of floating members distributed around the circumference of each tubular means, said floating members being exchangeably connected to said tubular means.

2. A device according to claim 1, in which the lower end of said tubular means is provided with transversely extending holding means.

3. A device according to claim 2, in which said transversely extending holding means project downwardly from the lower end of said tubular means.

4. A device according to claim 2, in which said transversely extending holding means extend over the entire opening at the lower end of said tubular means.

5. A device according to claim 2, in which the transversely extending holding means comprise two arms extending from opposite sides of said tubular means at the lower end thereof so as to leave some space between the free end of said arms.

6. A device according to claim 1, in which said tubular means are telescopically and adjustably interconnecting tubes.

7. A device according to claim 1, in which said floating body forms a plate-shaped member.

8. A device according to claim 1, in which said floating body comprises a hollow plate-shaped body.

9. A device according to claim 1, in which said floating body is adjustable relative to said tubular means.

10. A device according to claim 1, in which said tubular means are formed by strips arranged around an imaginary cylinder in spaced relationship to each other around the circumference of said cylinder, and which includes means interconnecting said strips.

11. A device according to claim 1, in which said tubular means are at their lower end bent inwardly in the direction toward the longitudinal axis of said tubular means.

12. A device according to claim 1, in which said tubular means above the water line of said floating body are provided with a perforation for an exchange of air from the outside toward the inside and vice versa of said tubular means.

13. A device according to claim 12, in which said perforations are designed as nozzle means.

14. A device for feeding fish, especially pet fish, which includes: a floating body adapted to float on water, tubular means forming an angle with said floating body and being supported thereby for slidingly receiving and guiding bodies of fish food, said tubular means extending below the water line of said floating body and being partially open at the lower end thereof so as to hold bodies of fish food in said tubular means while permitting fish to have access to the respective lowermost body of fish food in said tubular means, in which said floating body comprises a plurality of floating members distributed around the circumference of each tubular means, said tubular means being provided with peripheral grooves extending in the longitudinal direction thereof, said floating members adjustably engaging said grooves.

* * * * *